US012513620B2

(12) United States Patent
Hosseini et al.

(10) Patent No.: US 12,513,620 B2
(45) Date of Patent: *Dec. 30, 2025

(54) EXTENDING DISCONTINUOUS RECEPTION (DRX) ON DURATIONS IN SIDELINK DRX OPERATIONS

(71) Applicant: QUALCOMM Incorporated, San Diego, CA (US)

(72) Inventors: Seyedkianoush Hosseini, San Diego, CA (US); Wei Yang, San Diego, CA (US); Linhai He, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,867

(22) Filed: Sep. 20, 2023

(65) Prior Publication Data

US 2024/0089856 A1 Mar. 14, 2024

Related U.S. Application Data

(63) Continuation of application No. 17/450,126, filed on Oct. 6, 2021, now Pat. No. 11,785,547.

(60) Provisional application No. 63/088,833, filed on Oct. 7, 2020.

(51) Int. Cl.
*H04W 52/02* (2009.01)
*H04L 1/00* (2006.01)
*H04W 72/02* (2009.01)
*H04W 92/18* (2009.01)

(52) U.S. Cl.
CPC ....... *H04W 52/0232* (2013.01); *H04L 1/0025* (2013.01); *H04W 72/02* (2013.01); *H04W 92/18* (2013.01)

(58) Field of Classification Search
CPC . H04W 52/0232; H04W 72/02; H04W 92/18; H04W 76/14; H04W 76/28; H04L 1/0025; Y02D 20/70
See application file for complete search history.

(56) References Cited

U.S. PATENT DOCUMENTS

| | | | |
|---|---|---|---|
| 2021/0037468 A1* | 2/2021 | Huang | H04W 76/14 |
| 2021/0227602 A1* | 7/2021 | Li | H04W 76/14 |
| 2022/0095229 A1* | 3/2022 | Ryu | H04W 76/28 |
| 2022/0110058 A1 | 4/2022 | Hosseini et al. | |

FOREIGN PATENT DOCUMENTS

EP 3780891 A1 * 2/2021 ............. H04W 4/06

* cited by examiner

*Primary Examiner* — Jianye Wu
(74) *Attorney, Agent, or Firm* — Patterson+ Sheridan, L.L.P.

(57) ABSTRACT

Certain aspects provide a method for wireless communication by a first user equipment (UE), such as a receiver (RX) UE. The method generally includes receiving signaling configuring the first UE with a discontinuous reception (DRX) mode having one or more DRX ON durations for sidelink communications with at least a second UE, and deciding to extend a DRX ON duration of the one or more DRX ON durations configured for the first UE when the first UE is in the DRX ON duration and when one or more conditions are met.

17 Claims, 12 Drawing Sheets

EXTENDING DISCONTINUOUS RECEPTION (DRX) ON DURATIONS IN SIDELINK DRX OPERATIONS

CROSS-REFERENCE TO RELATED APPLICATION

This application is a continuation of U.S. patent application Ser. No. 17/450,126, filed Oct. 6, 2021, which claims benefit of and priority to U.S. Provisional Application No. 63/088,833 filed Oct. 7, 2020, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for sidelink communication in discontinuous reception (DRX) operations.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved sidelink communication in discontinuous reception (DRX) operations.

Certain aspects of the subject matter described in this disclosure can be implemented in a method for wireless communication by a first user equipment (UE). The method generally includes receiving signaling configuring the first UE with a DRX mode having one or more DRX ON durations for sidelink communications with at least a second UE; and deciding to extend a DRX ON duration of the one or more DRX ON durations configured for the first UE when the first UE is in the DRX On duration and when one or more conditions are met.

Certain aspects of the subset matter described in this disclosure can be implemented in a method for wireless communication by a first UE. The method generally includes determining a second UE should extend a DRX ON duration of one or more DRX ON durations configured for the second UE when the second UE is in the DRX ON duration and when one or more conditions are met and reserving one or more resources outside the DRX ON duration for sidelink communications with the second UE.

Certain aspects of the subject matter described in this disclosure can be implemented in an apparatus for wireless communications by a first UE. The apparatus generally includes at least one processor; and a memory coupled to the least at least one processor to cause the apparatus to: receive signaling configuring the first UE with a DRX mode having one or more DRX ON durations for sidelink communications with at least a second UE; and decide to extend a DRX ON duration of the one or more DRX ON durations configured for the first UE when the first UE is in the DRX ON duration and when one or more conditions are met.

Certain aspects of the subject matter described in this disclosure can be implemented in an apparatus for wireless communications by a first UE. The apparatus generally includes at least one processor; and a memory coupled to the least at least one processor to cause the apparatus to: determine a second UE should extend a DRX ON duration of one or more DRX ON durations configured for the second UE when the second UE is in the DRX ON duration and when one or more conditions are met and reserve one or more resources outside the DRX ON duration for sidelink communications with the second UE.

Certain aspects of the subject matter described in this disclosure can be implemented in an apparatus for wireless communications by a first UE. The apparatus generally includes means for receiving signaling configuring the first UE with a DRX mode having one or more DRX ON durations for sidelink communications with at least a second UE; and means for deciding to extend a DRX ON duration of the one or more DRX ON durations configured for the first UE when the first UE is in the DRX ON duration and when one or more conditions are met.

Certain aspects of the subject matter described in this disclosure can be implemented in an apparatus for wireless communications by a first UE. The apparatus generally includes means for determining a second UE should extend a DRX ON duration of one or more DRX ON durations configured for the second UE when the second UE is in the DRX ON duration and when one or more conditions are met and means for reserving one or more resources outside the DRX ON duration for sidelink communications with the second UE.

Certain aspects of the subject matter described in this disclosure can be implemented in a computer-readable medium for wireless communications including instructions that, when executed by a processing system in a first UE, cause the processing system to perform operations including: receiving signaling configuring the first UE with a DRX mode having one or more DRX ON durations for sidelink communications with at least a second UE; and deciding to extend a DRX ON duration of the one or more DRX ON durations configured for the first UE when the first UE is in the DRX ON duration and when one or more conditions are met.

Certain aspects of the subject matter described in this disclosure can be implemented in a computer-readable medium for wireless communications including instructions that, when executed by a processing system in a first UE, cause the processing system to perform operations including: determining a second UE should extend a DRX ON duration of one or more DRX ON durations configured for the second UE when the second UE is in the DRX ON duration and when one or more conditions are met and reserving one or more resources outside the DRX ON duration for sidelink communications with the second UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer-readable mediums for enhancing sidelink discontinuous reception. For example, certain aspects provide techniques for extending a sidelink DRX ON phase associated with a sidelink DRX configuration.

The following description provides examples of configurations for sidelink communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Example Wireless Communications Network

Figure 1:
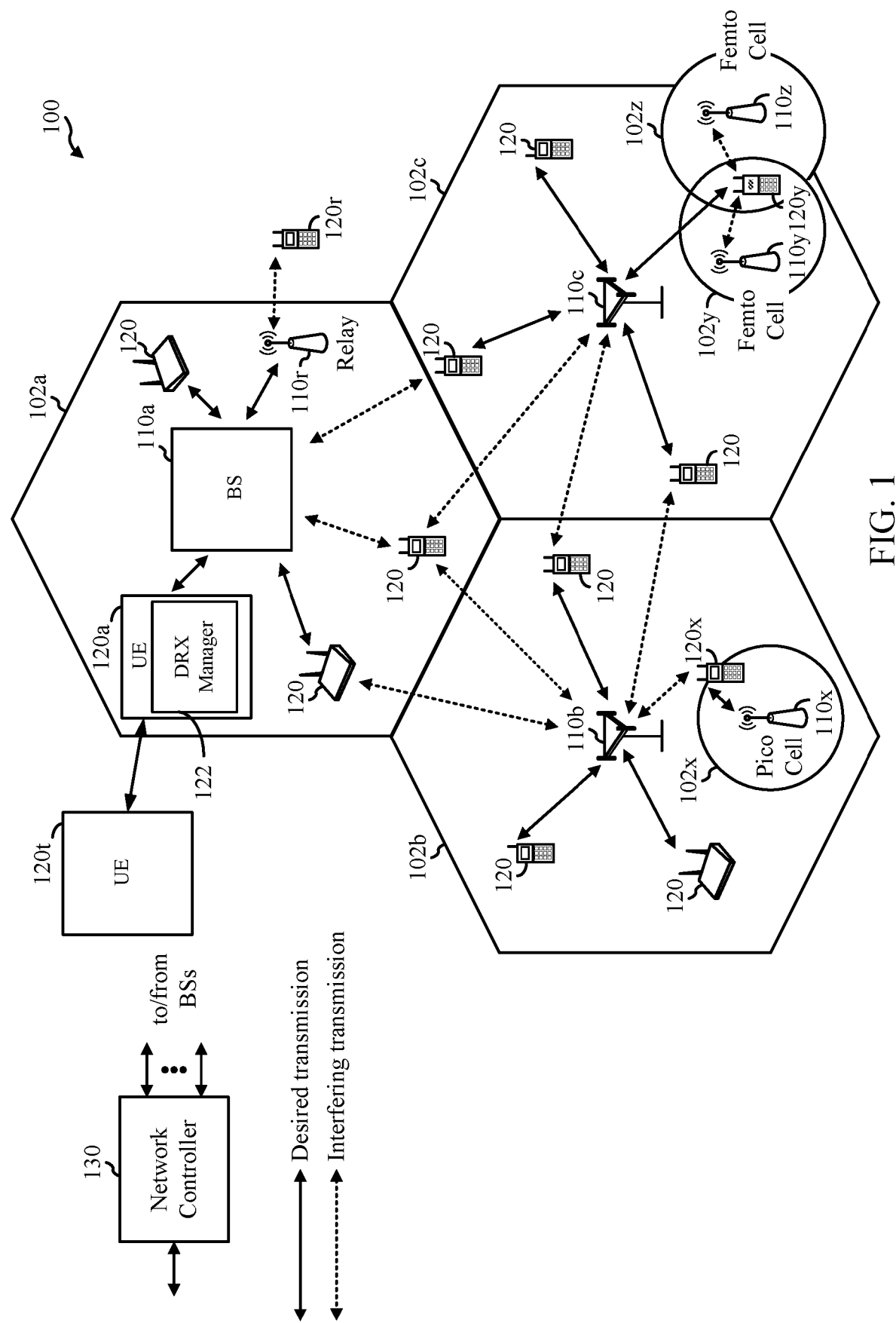
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, as shown in FIG. 1, wireless communication network 100 may include one or more user equipments (UEs) 120 in sidelink communication. In particular, UE 120a may include a discontinuous reception (DRX) manager 122 configured to perform operations 900 of FIG. 9 to extend a DRX ON duration when performing sidelink communications with another UE, such as UE 120t.

As illustrated in FIG. 1, wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. BS 110x may be a pico BS for a pico cell 102x. BSs 110y and 110z may be femto BSs for femto cells 102y and 102z, respectively. A BS may support one or multiple cells. BSs 110 communicate with UEs 120a-y (each also individually referred to herein as UE 120 or collectively as UEs 120) in wireless communication network 100. UEs 120 (e.g., 120x, 120y, etc.) may be dispersed throughout wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. Network controller 130 may communicate with BSs 110 via a backhaul. BSs 110 may also communicate with one another (e.g., directly or indirectly) via wireless or wireline backhaul.

Figure 2:
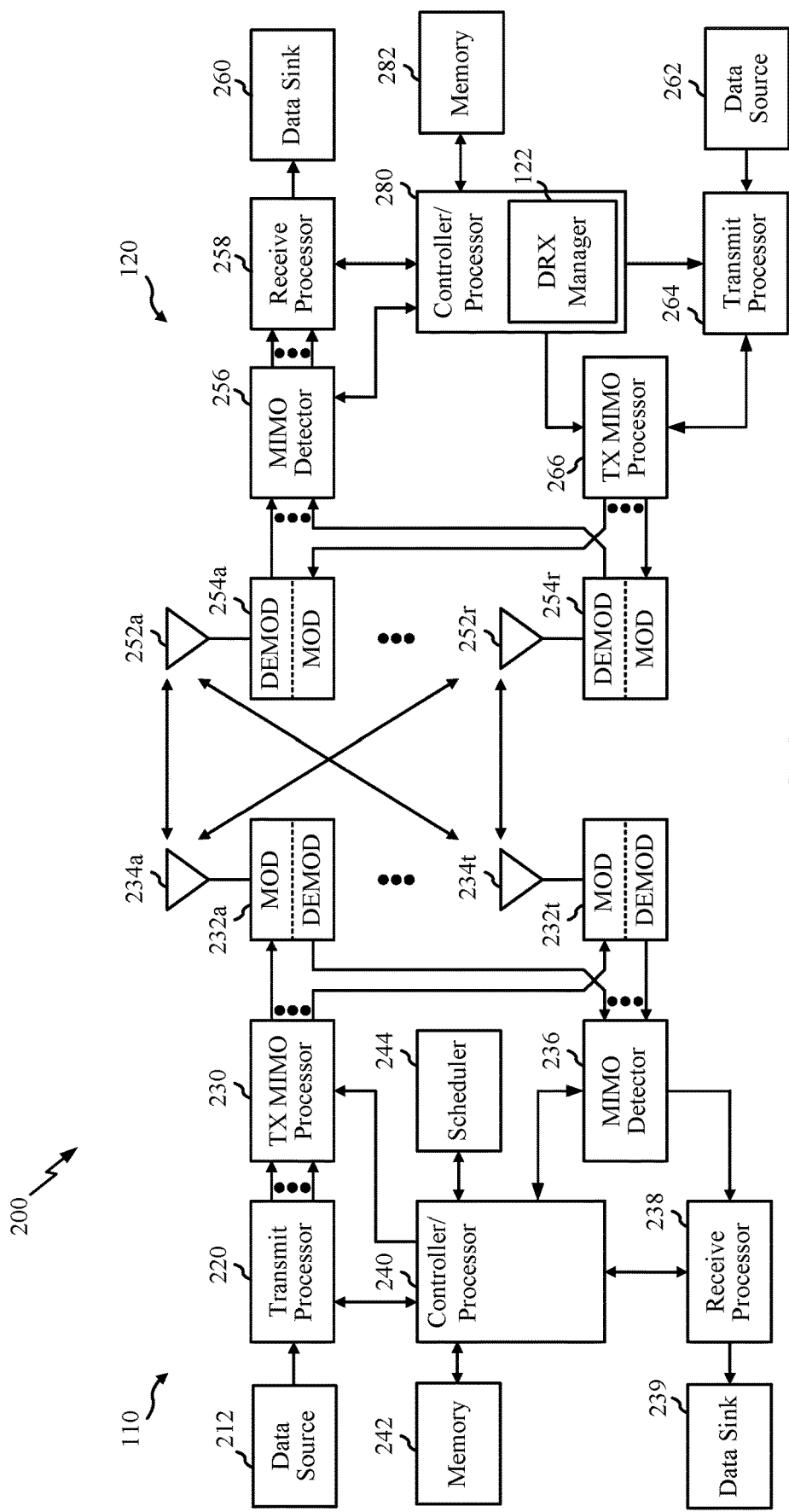
FIG. 2 is a block diagram conceptually illustrating a design of an example base station (B S) and an example user equipment (UE), in accordance with certain aspects of the present disclosure.

FIG. 2 is a block diagram conceptually illustrating a design of an example BS 110a and an example UE 120a (e.g., in the wireless communication network 100 of FIG. 1), in accordance with certain aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from modulators in transceivers 232a-232t may be transmitted via the antennas 234a-234t, respectively.

At UE 120a, antennas 252a-252r may receive the DL signals from BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by demodulators in transceivers 254a-254r (e.g., for single-carrier frequency division multiplexing (SC-FDM), etc.), and transmitted to BS 110a. At BS 110a, the UL signals from UE 120a may be received by antennas 234, processed by modulators in transceivers 232a-232t, detected by MIMO detector 236 if applicable, and further processed by receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs 120 for data transmission on the DL and/or UL.

As shown in FIG. 2, controller/processor 280 and/or other processors and modules at UE 120a may perform or direct the execution of processes for the techniques described herein. For example, controller/processor 280 of UE 120*a* has a DRX manager 122 that may be configured to perform operations 900 of FIG. 9. Although shown at controller/processor 280, other components of UE 120*a* may be used to perform the operations described herein.

Example Sidelink Communications

While communication between UEs (e.g., UE 120 of FIGS. 1 and 2) and BSs (e.g., BSs 110 of FIGS. 1 and 2) may be referred to as the access link, and the access link may be provided via a cellular interface (e.g., Uu interface), communication between devices may be referred to as the sidelink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 3A:
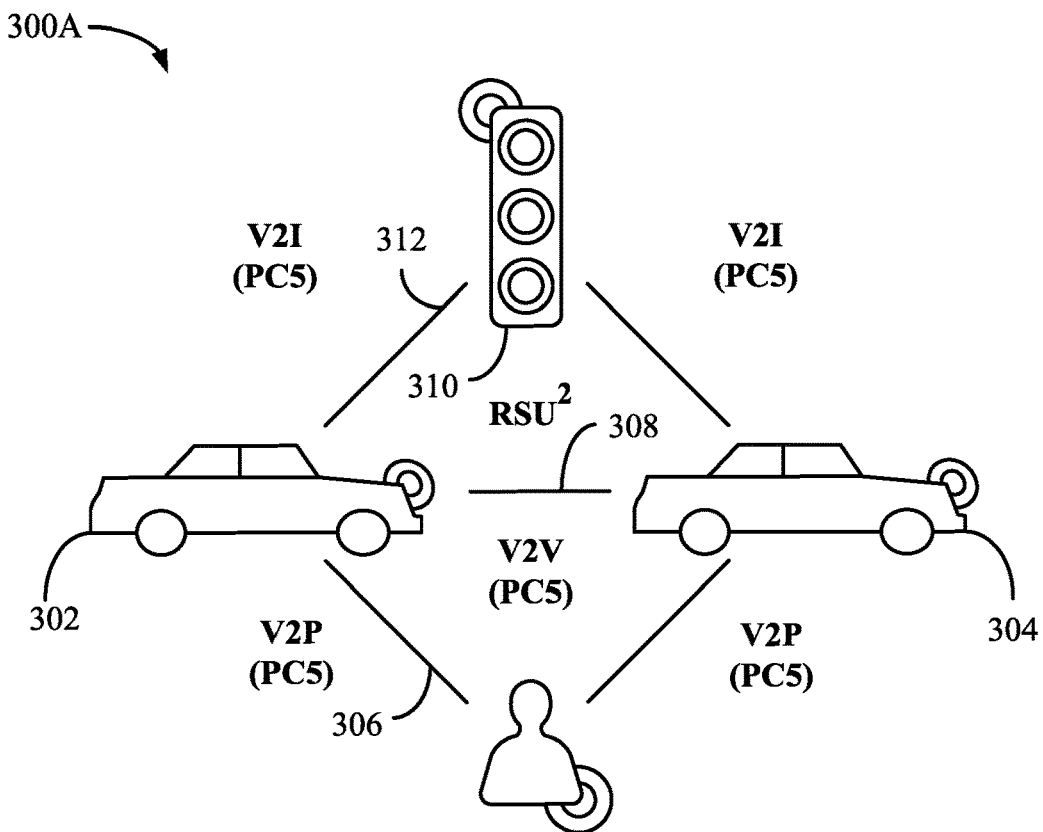
FIGS. 3A and 3B show diagrammatic representations of example vehicle to everything (V2X) systems in accordance with some aspects of the present disclosure.
Figure 3B:
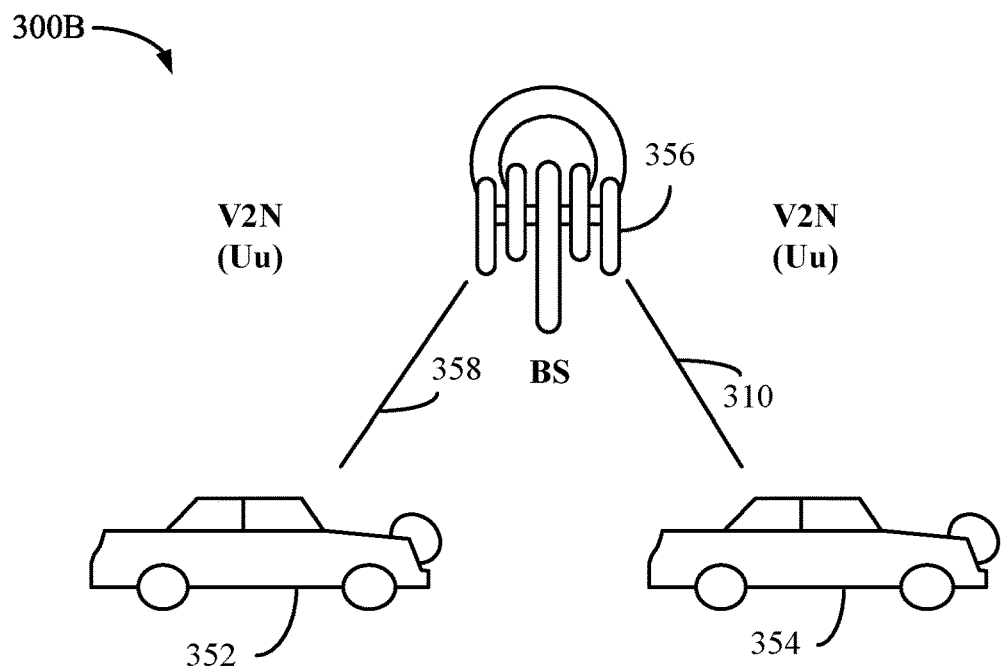

FIGS. 3A and 3B show diagrammatic representations of example vehicle to everything (V2X) systems in accordance with some aspects of the present disclosure. For example, the vehicles shown in FIGS. 3A and 3B may communicate via sidelink channels and may perform sidelink channel state information (CSI) reporting as described herein.

V2X systems, provided in FIGS. 3A and 3B, provide two complementary transmission modes. A first transmission mode, shown by way of example in FIG. 3A, involves direct communications (for example, also referred to as sidelink communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE).

Referring to FIG. 3A, a V2X system 300A (for example, including vehicle-to-vehicle (V2V) communications) is illustrated with two vehicles 302, 304 (e.g., UEs). The first transmission mode allows for direct communication between different participants in a given geographic location. As illustrated, a vehicle may have a wireless communication link 306 with an individual (i.e., vehicle-to-pedestrian (V2P)) (for example, via a UE) through a PC5 interface. Communications between vehicles 302 and 304 may also occur through a PC5 interface 308. In a like manner, communication may occur from a vehicle 302 to other highway components (for example, roadside service unit (RSU) 310), such as a traffic signal or sign (i.e., vehicle to infrastructure (V2I)) through a PC5 interface 312. With respect to each communication link illustrated in FIG. 3A, two-way communication may take place between elements, therefore each element may be a transmitter and a receiver of information. V2X system 300A may be a self-managed system implemented without assistance from a network entity. A self-managed system may enable improved spectral efficiency, reduced cost, and increased reliability as network service interruptions do not occur during handover (HO) operations for moving vehicles. V2X system 300A may be configured to operate in a licensed or unlicensed spectrum, thus any vehicle with an equipped system may access a common frequency and share information. Such harmonized/common spectrum operations allow for safe and reliable operation.

FIG. 3B shows a V2X system 300B for communication between a vehicle 352 (e.g., UE) and a vehicle 354 (e.g., UE) through a network entity 356. These network communications may occur through discrete nodes, such as a BS (for example, an eNB or gNB), that sends and receives information to and from (for example, relays information between) vehicles 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data may be obtained from cloud-based sharing services.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

The PSFCH may carry feedback such as acknowledgement (ACK) or negative acknowledgment (NACK) for hybrid automatic repeat request (HARQ) feedback. The PSFCH may also carry feedback such as channel state information (CSI) related to a sidelink channel quality.

In 3GPP Release 16, a UE may be configured by higher layers with one or more sidelink resource pools. A SL resource pool may be for transmission or reception of PSSCH. In particular, for the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

Figure 4A:
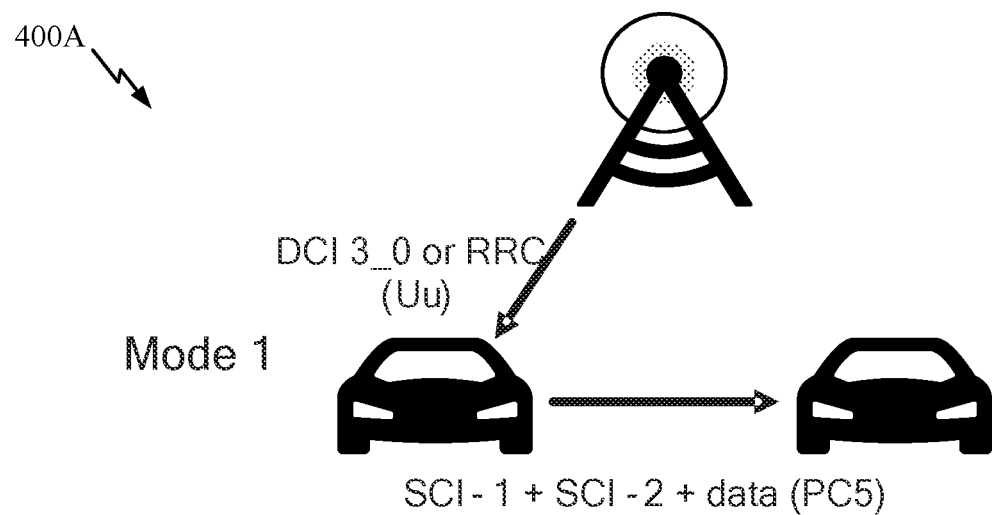
FIGS. 4A and 4B illustrate two modes of sidelink communication, in accordance with certain aspects of the present disclosure.
Figure 4B:
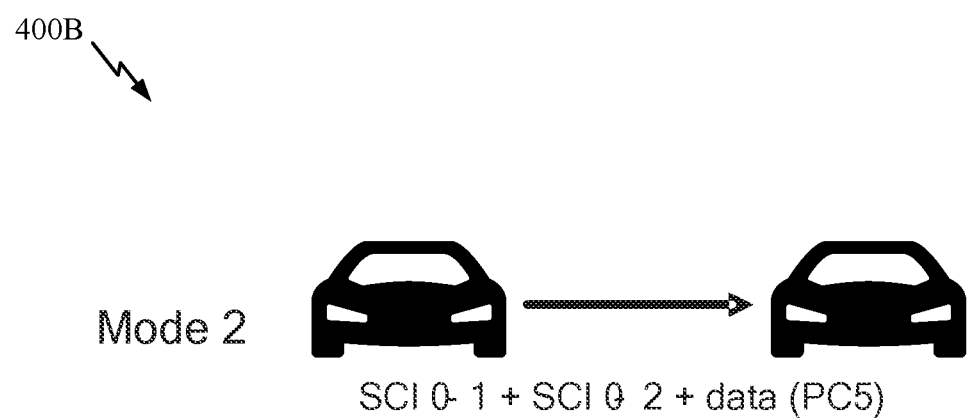

In NR, there are generally two basic sidelink resource allocation modes. FIGS. 4A and 4B illustrate two modes of sidelink communication 400A and 400B, respectively, in accordance with certain aspects of the present disclosure. Receiver (RX) UE behavior may be the same for both sidelink resource allocation modes.

According to a first mode, Mode 1, as shown in FIG. 4A, a BS may allocate sidelink resources for sidelink communication between UEs. For example, a BS may transmit downlink control information (DCI) (e.g., DCI 3_0) to allocate time and frequency resources and indicate transmission timing. A modulation and coding scheme (MCS) may be determined by a UE within the limit set by the BS.

According to a second mode, Mode 2, as shown in FIG. 4B, UEs may determine the sidelink resources (the BS does not schedule sidelink transmission resources within sidelink resources configured by BS/network). In this case, UEs may autonomously select sidelink resources for transmission (following some rules in the NR standard). A UE may assist in sidelink resource selection for other UEs. A UE may be configured with an NR configured grant for sidelink transmission, and the UE may schedule sidelink transmissions for other UEs.

Figure 5:
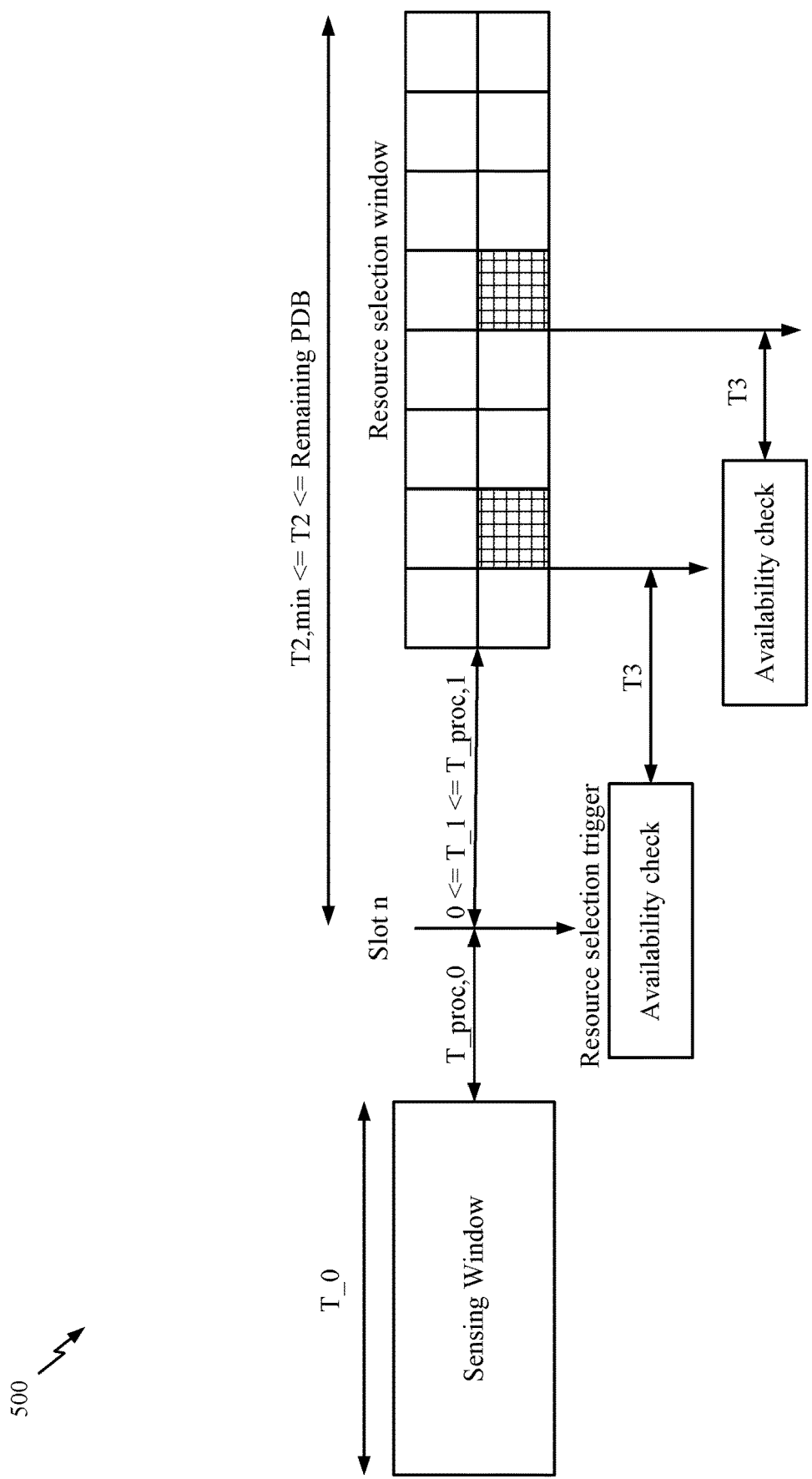
FIG. 5 illustrates an example of resource allocation for sidelink communications, in accordance with certain aspects of the present disclosure.

FIG. 5 illustrates an example 500 of resource allocation for sidelink communications, in accordance with certain aspects of the present disclosure. As illustrated in FIG. 5, resource allocation Mode 2 supports the sensing and reservation of sidelink resources, at least for blind retransmission. In particular, a UE can select new sidelink resources when it generates a new transport block (TB). To select new sidelink resources, a UE first defines a selection window where it looks for candidate resources to transmit a TB. The selection window includes all resources within the range of slots [n+T1, n+T2], where n is the slot at which new resources are to be selected. T1 is the processing time required by a UE to identify candidate resources and select new SL resources for transmission. The value of T2 is left to UE implementation; however T2 must be included in the range of $T2,min \leq T2 \leq PDB$, where PDB is the packet delay budget. PDB is the latency deadline by which the TB is to be transmitted. Once the selection window is defined, the UE identifies the candidate resources within the selection window. When a UE is not transmitting, it senses the sidelink resources during the sensing window in order to identify the available candidate resources.

Example Discontinuous Reception (DRX) in Sidelink

According to certain aspects, a wireless node, such as a relay user equipment (UE) with multiple sidelinks for multiple remote UEs, may decide power savings configurations to be used for the multiple sidelinks and/or for the access link. In some examples, the power savings configuration may be a discontinuous reception (DRX) mode configuration.

In a DRX mode of operation, a UE may enter a low power ("sleep") mode, which may also be referred to as a sleep phase or low power state, for a certain period of time (referred to as a DRX OFF phase, or duration) and wake up again during a DRX ON (e.g., awake phase) duration (also referred to as a DRX ON phase) to determine if there is any data to be received. The cycle of DRX ON and DRX OFF durations repeat over time, allowing the UE to save power while maintaining communication. In some cases, a UE may be configured with a DRX configuration for the access link (e.g., Uu link).

Figure 6A:
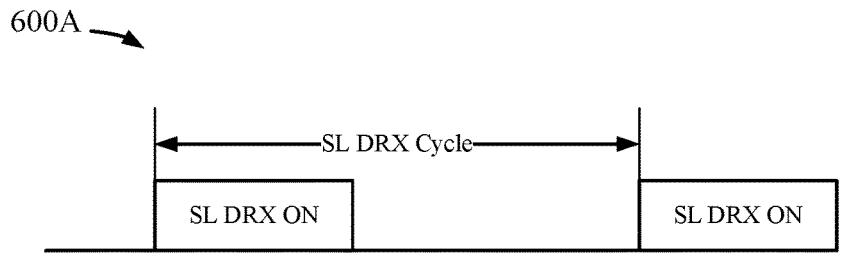
FIGS. 6A-6C illustrate example sidelink discontinuous reception (DRX) configurations of a UE, in accordance with certain aspects of the present disclosure.
Figure 6B:
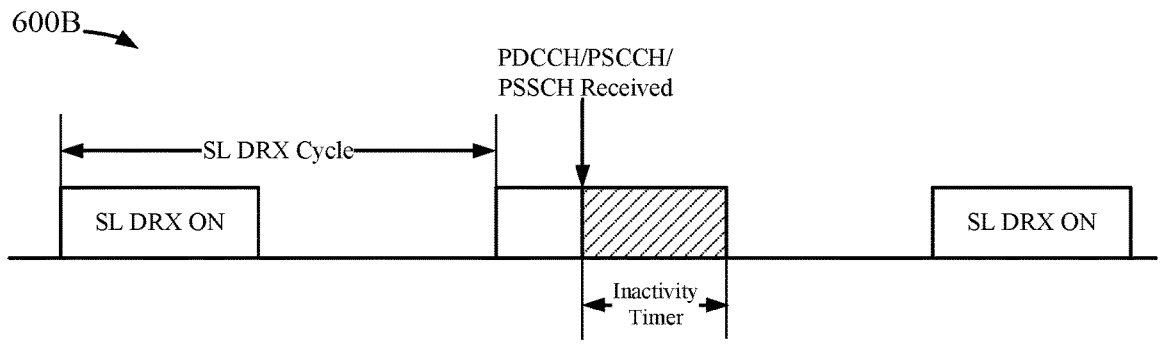
Figure 6C:
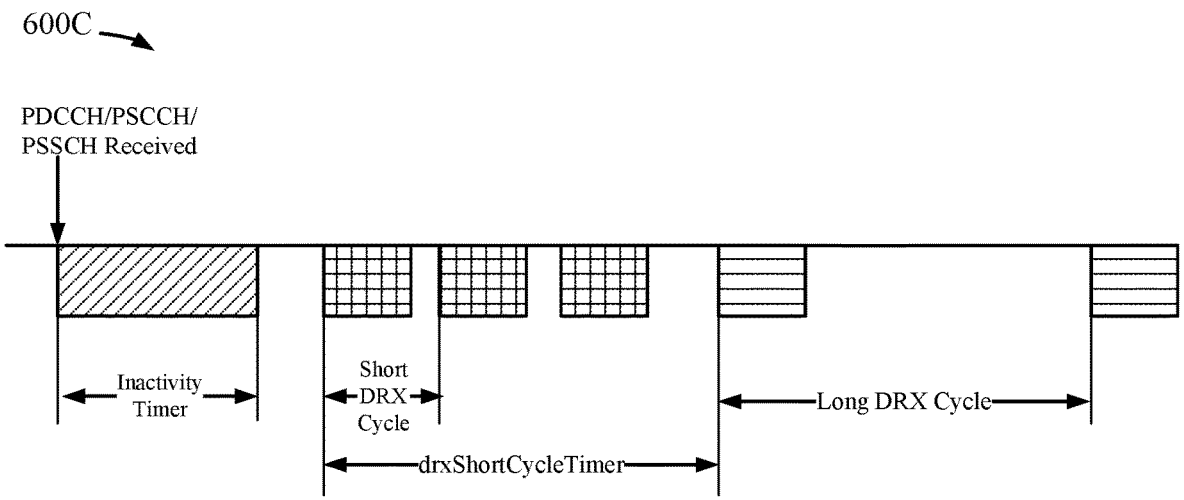

FIGS. 6A-6C illustrate example sidelink DRX configurations of a UE, in accordance with certain aspects of the present disclosure. A UE may be configured for DRX operations according to various configuration parameters, such as an inactivity timer, short DRX timer, short DRX cycle, and long DRX cycle.

FIG. 6A illustrates an example DRX configuration 600A of a UE configured with a Long DRX Cycle and where no physical downlink control channel (PDCCH) is received during the DRX cycle. As illustrated in FIG. 6A, DRX configuration 600A may include DRX ON phases. As described herein, a DRX ON phase repeats every DRX cycle. For example, the DRX ON phase is during the DRX cycle, as illustrated. When a UE is awake, or in other words in a DRX ON duration, the UE may monitor for signaling that may be received, such as, for example, PDCCH transmissions from a BS (e.g., gNB for Uu DRX) and/or physical sidelink control channel (PSCCH) transmissions/physical sidelink shared channel (PSSCH) transmissions from a sidelink UE (for sidelink DRX). Alternatively, when the UE is in a low power state (e.g., sleep phase or DRX OFF duration), the UE may stop monitoring for transmissions for the remainder of the DRX cycle. During the DRX OFF duration, the UE may not be expected to transmit and/or receive any signal.

FIG. 6B illustrates an example DRX configuration 600B of a UE configured with a Long DRX Cycle and where a PDCCH is received during the DRX cycle. As illustrated in FIG. 6B, DRX configuration 600B may include DRX ON phases, repeating every DRX cycle. The configuration may include the reception of a PDCCH/PSCCH/PSSCH which activates an inactivity timer, as illustrated. The inactivity timer specifies how long the UE may remain "ON" after the reception of the PDCCH/PSCCH/PSSCH.

FIG. 6C illustrates an example DRX configuration 600C of a UE configured with both Long DRX Cycles and Short DRX Cycles and where a PDCCH is received during a DRX cycle. As illustrated in FIG. 6C, DRX configuration 600C may include DRX ON phases, repeating every DRX cycle. The configuration may include the reception of a PDCCH/PSCCH/PSSCH which activates an inactivity timer, as illustrated. The inactivity timer specifies how long the UE may remain "ON" after the reception of the PDCCH/PSCCH/PSSCH. Parameter, Short DRX Cycle, indicates a DRX cycle which can be implemented within the "OFF" period of a Long DRX Cycle. Parameter, drxShortCycleTimer, indicates the consecutive number of subframes for which the UE shall follow the Short DRX Cycle after the DRX Inactivity Timer has expired (i.e., drxShortCycleTimer indicates the number of times Short DRX Cycle is repeated).

DRX configurations may also be implemented for UEs in sidelink communication. Without SL DRX, a receiver (RX) UE has to monitor for sidelink control information (SCI), for each time slot, causing high power consumption at the UE. This may be especially detrimental for battery power confined UEs, such as pedestrian UEs for vehicle-to-person (V2P) service on sidelink or UEs for public safety services on sidelink. Thus, sidelink DRX design may be desirable to save power for sidelink communications.

As compared to communications between a UE and a BS on the Uu interface, sidelink communications among different UEs are more diverse. For example, a UE may simultaneously engage in different vehicle-to-everything (V2X) services with different quality of service (QoS) requirements (e.g., reliability, latency, etc.), and different communication types (e.g., broadcast, groupcast and unicast). Therefore, a one-size-fits-all SL DRX design may not be best for both saving power and meeting diverse QoS requirements.

Configuring DRX in a wireless communication system may be accomplished in various ways, including, indication of the DRX configuration by a BS (e.g., gNB) or selection of the DRX configuration by a sidelink UE based on a communication type (e.g., cast type among broadcast, groupcast and unicast). For the first case, the DRX configuration may be indicated by a BS (e.g., gNB) either directly or indirectly, e.g., via a relay. For the second case, selection of the DRX configuration may depend on whether sidelink traffic is broadcast, managed groupcast, connection-less groupcast, or unicast communication.

For example, for broadcast, the layer 2 (L2) destination identifier (ID) is derived based on the application. Accordingly, the DRX configuration is derived based on the L2 destination ID. For managed groupcast, the application layer provides a group information ID which maps to the L2 destination ID. Accordingly, the group information ID is used to select a DRX configuration index. For connectionless groupcast, the L2 destination ID is derived based on the service type. Accordingly, the DRX configuration is derived based on the L2 destination ID. In addition, the DRX configuration may also be derived based on the zone ID. For unicast, both the source and destination IDs are used to derive the DRX configuration. Additionally, selection of the pattern may also be negotiated between the UEs during the 5 sidelink (PC5) link setup.

For resource allocation Mode 2, as described above, it may be desirable to have a system-wide aligned DRX per resource configuration. A system-wide aligned DRX per resource configuration may have either (1) different DRX patterns with fully overlapping DRX ON durations or (2) different DRX patterns with fully non-overlapping DRX ON durations. For a given UE in a system-wide aligned DRX per resource configuration, the final DRX ON duration is a union of the DRX ON duration of all DRX configurations in the resource pool based on the cast types and the applications that the UE supports.

Figure 7:
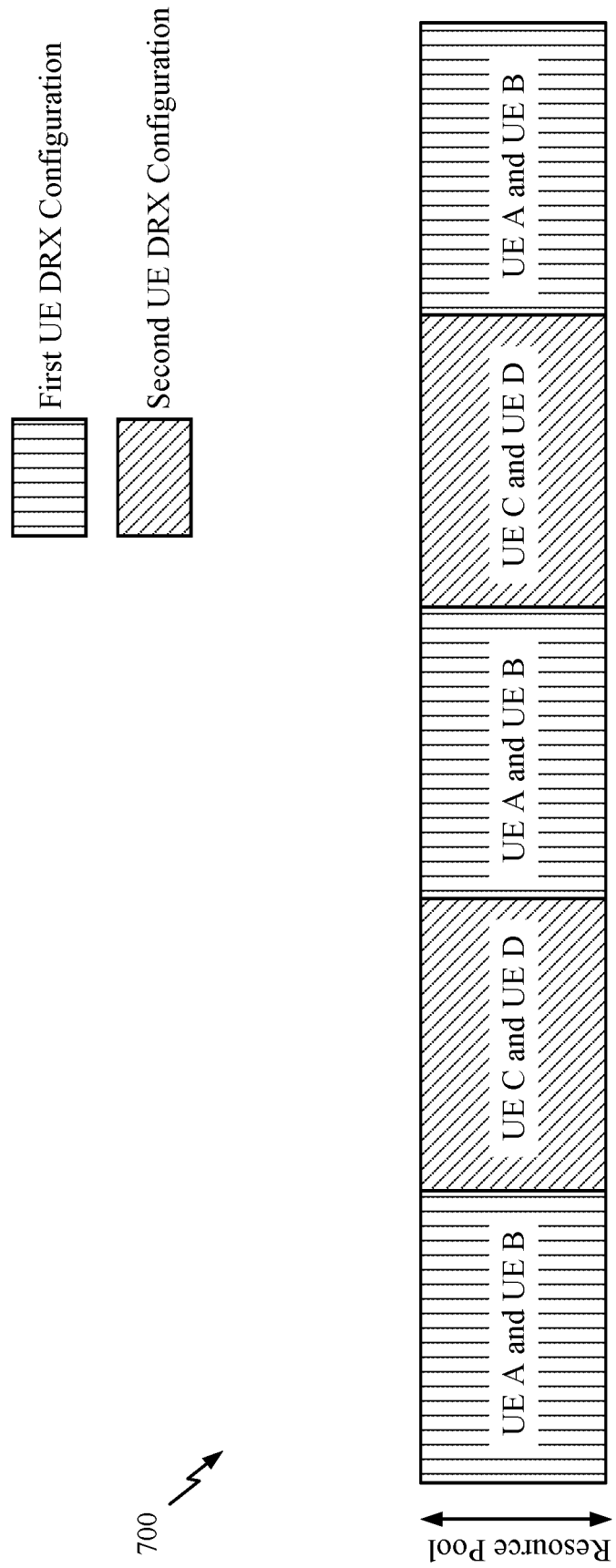
FIG. 7 illustrates an example of aligned DRX configurations, in accordance with certain aspects of the present disclosure.

FIG. 7 illustrates an example of aligned DRX configurations, in accordance with certain aspects of the present disclosure. As shown in FIG. 7, aligned DRX configurations may have different DRX patterns with fully non-overlapping DRX ON durations. In particular, the illustrated system-wide aligned DRX per resource configuration 700 may include two DRX configurations configured on a given resource; a first DRX configuration for UE A and UE B and a second DRX configuration for UE C and UE D. The system-wide aligned DRX configuration of FIG. 6, may be desirable given a non-aligned DRX configuration has the potential to increase the probability of resource block (RB) collisions in the system.

Figure 8:
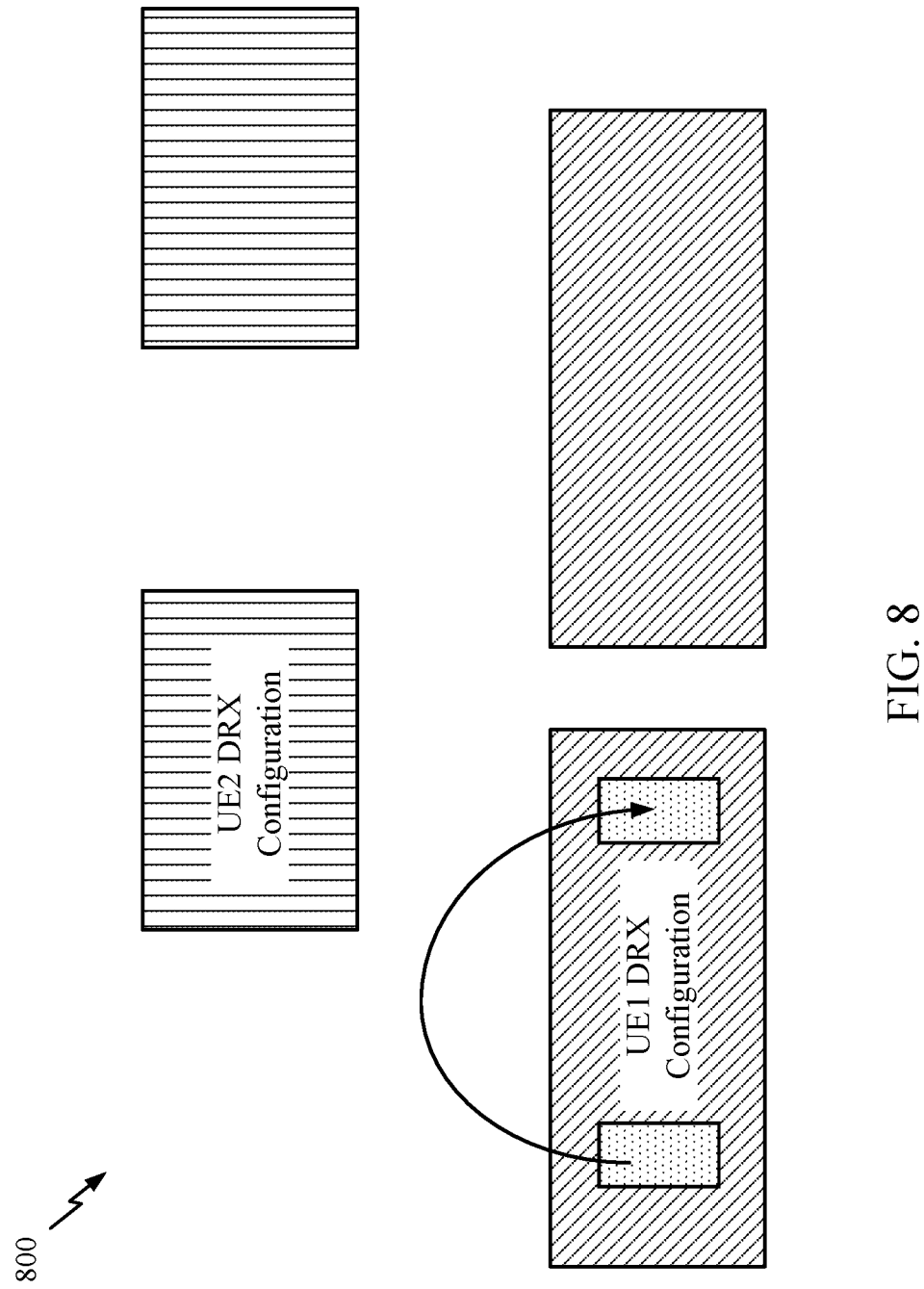
FIG. 8 illustrates an example of non-aligned DRX configurations, in accordance with certain aspects of the present disclosure.

FIG. 8 illustrates an example of non-aligned DRX configurations, in accordance with certain aspects of the present disclosure. As shown in FIG. 8, non-aligned DRX configurations may include two DRX configurations on a given resource, with non-aligned patterns. When the patterns are not aligned (as in the illustrated example), a first UE, UE1, with a UE1 DRX configuration may reserve resources in the overlapping portion signaled from the DRX OFF duration of a second UE, UE2, with a UE2 DRX configuration. Hence, UE2 may not see (or detect) the reservation made by UE1 and attempt to choose the same resource as chosen by UE1, thereby resulting in a collision.

In some cases, DRX ON durations may be extended by an amount determined by an inactivity timer. In some cases, as an alternative (or in addition) to the inactivity timer, DRX ON durations may be extended by an amount determined by a DRX retransmission timer, DRX hybrid automatic repeat request (HARQ) round-trip time (RTT) timer, and/or the like. While such extended DRX ON durations may allow for additional data to be transmitted without having to wait until a subsequent DRX ON duration (based on a configured DRX cycle), this may also lead to non-aligned DRX configurations. One reason to extended DRX ON periods is to satisfy various QoS characteristics, such as packet delay budget.

Packet delay budget informs network nodes as to the amount of delay which can be tolerated for packets passing through a particular evolved packet system (EPS) bearer. If packet delay budget is small a DRX ON period may be extended to allow data to be transmitted in a current (extended) DRX ON period, as the small delay may not allow waiting until a subsequent DRX ON period.

Although configuring a UE with a SL DRX inactivity timer is useful for accommodating a small packet delay budget, the SL DRX inactivity timer may cause patterns of different DRX configurations to become non-aligned. As mentioned above, a non-aligned DRX configuration has the potential to increase the probability of RB collisions. Accordingly, aspects of the present disclosure provide improved techniques and apparatuses for extending DRX ON durations in SL DRX operations.

Example Discontinuous Reception (DRX) ON Duration Extensions in Sidelink DRX Operations Aspects of the present disclosure provide techniques for extending discontinuous reception (DRX) ON durations when certain conditions are met.

Figure 9:
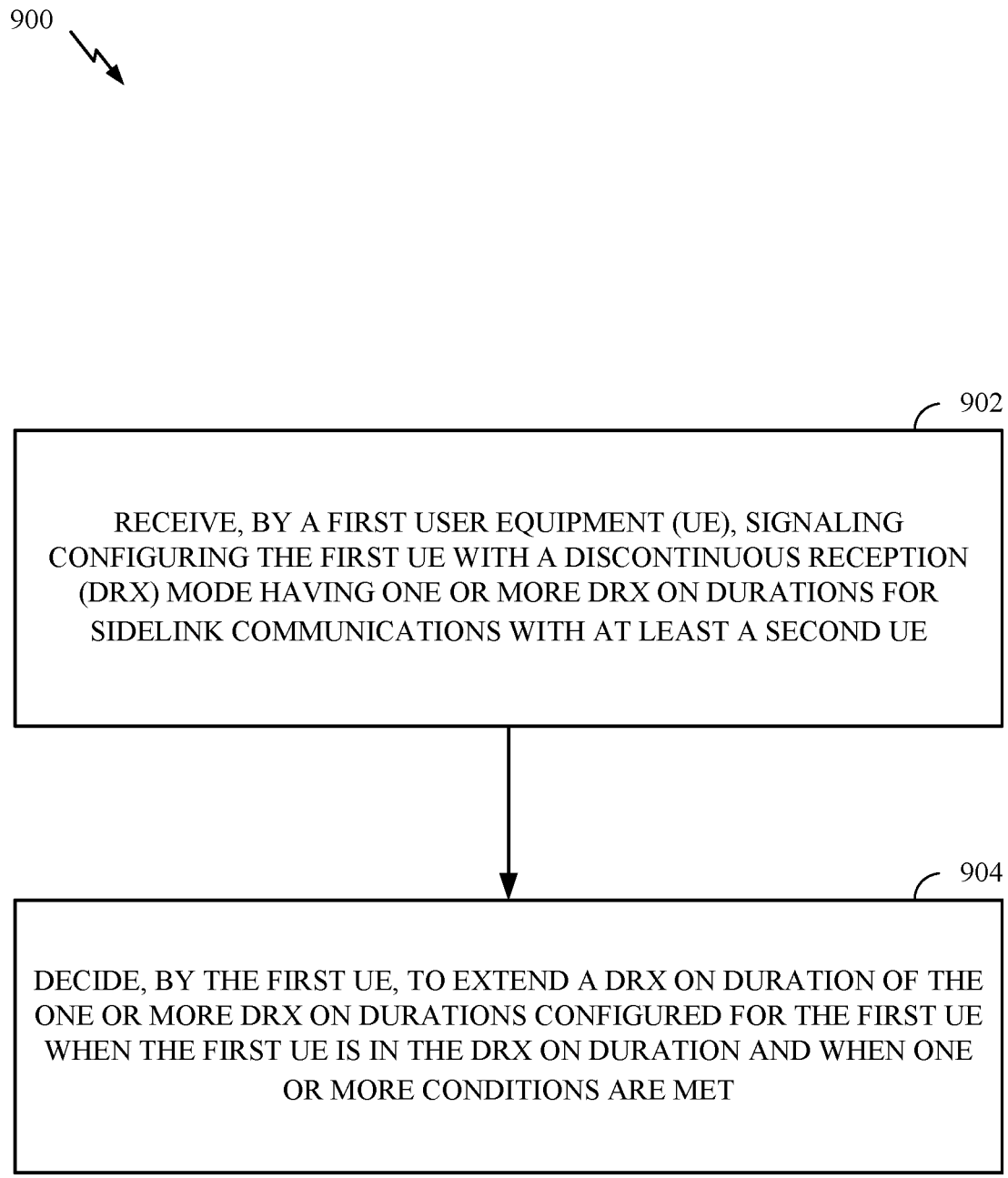
FIG. 9 is a flow diagram illustrating example operations for wireless communication by a receiver (RX) UE, in accordance with certain aspects of the present disclosure.

FIG. 9 is a flow diagram illustrating example operations 900 for wireless communication by a UE, in accordance with certain aspects of the present disclosure. Operations 900 may be performed, for example, by a first UE (e.g., such as UE 120a or UE 120t in wireless communication network 100), such as a receiver (RX) UE. An RX UE generally refers to a UE receiving during a DRX ON duration.

Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 900 begin, at 902, by a first UE receiving signaling configuring the first UE with a DRX mode having one or more DRX ON durations for sidelink communications with at least a second UE.

At 904, the first UE decides to extend a DRX ON duration of the one or more DRX ON durations configured for the first UE when the first UE is in the DRX ON duration (e.g., when the first UE is has exited from a reduced power state to engage in sidelink communication with at least the second UE) and when one or more conditions are met.

In some cases, the first UE extends the DRX ON duration by setting an inactivity timer to a non-zero value and extending the DRX ON duration at least until the inactivity timer expires. While aspects herein are described with respect to setting an inactivity timer to a non-zero value to extend the DRX ON duration, in some cases, a DRX retransmission timer, DRX hybrid automatic repeat request (HARQ) round-trip time (RTT) timer, and/or the like may be set to a non-zero value to extend the DRX ON duration, as well.

The one or more conditions may relate to various resource pool related attributes or packet related attributes. In particular, in some examples, the one or more conditions may include at least one condition based on an attribute of a resource pool assigned for sidelink communications between the first UE and a second UE. In some other examples, the one or more conditions may include at least one condition based on an attribute of a packet to be transmitted between the first UE and a second UE during the DRX ON duration. In some other examples, the one or more conditions may include at least one condition based upon an attribute of a cellular interface (e.g., Uu interface) between the first UE and a network entity (e.g., BS). Each of these conditions may be explained in more detail below.

In certain aspects of the present disclosure, a SL DRX ON duration may be extended to provide the UE an extended period of time to transmit data. The DRX ON duration may be extended when a small packet delay budget (PDB) does not allow for waiting until a next DRX ON duration. For example, a UE may receive signaling configuring the UE with a DRX mode. The DRX mode may include one or more DRX ON durations for sidelink communications between the UE and at least another UE. When the UE exits from a reduced power state to engage in sidelink communications with another UE during a DRX ON duration, in accordance with the DRX mode configuration, the UE may decide to extend the DRX ON duration.

According to certain aspects, whether the DRX ON duration may be extended by a UE may depend upon an attribute of a resource pool assigned for sidelink communications between the two UEs. For example, the attribute may indicate whether extending the DRX ON duration is allowed for the resource pool. Accordingly, whether a DRX ON duration may be extended or not is resource pool dependent (e.g., the attribute may be configured for each resource pool separately).

In some cases, the attribute may indicate a resource allocation mode configured for the resource pool. For example, if a resource pool is configured with resource allocation Mode 1, the BS (e.g., gNB) is in control of sidelink resource allocation for all UEs active on the same resource pool, as mentioned above with respect to FIG. 4A. Consequently, even if the DRX ON duration is extended, the BS, due to its awareness, may avoid granting overlapping resources to different UEs. This helps to prevent the potential for expected resource block (RB) collisions.

In some examples, the attribute may indicate whether the resource pool is configured with sidelink feedback. For example, if hybrid automatic repeat request (HARQ) feedback is not supported, and a UE decides to transmit sidelink control information (SCI) and reserve resources while not in the DRX ON duration, the UE may not know whether other UEs have received the first SCI (reserving the resources), or not. Thus, without the ability to know if the SCI is received by other UEs (e.g., because HARQ feedback is not supported), the transmitting UE may not extend the DRX ON duration. Hence, the RX UE(s) may not receive the packet (that would have been sent in the extended period).

Whether the DRX ON duration may be extended by a UE may be a function of packet attributes to be transmitted between two UEs during the DRX ON duration. Packet attributes may include packet priority, remaining packet delay budget (PDB), cast type, and/or geographical locations of the UEs or zone identifier (ID).

For example, the UE may decide to extend the DRX ON duration only for packet priorities below a certain threshold (i.e., more important packets). This may help to ensure that higher priority packets (e.g., priority 1) are prioritized for transmission, given the lower priority packets have a priority lower than a threshold (e.g., threshold of a priority 3).

As another example, the UE may decide to extend the DRX ON duration where the remaining PDB is insufficient to allow for the traffic to be transmitted in a subsequent DRX ON duration.

As another example, whether the DRX ON duration may be extended by a UE may be a function of cast type. In particular, whether the DRX ON duration may be extended depends on whether the communication is multi-cast, group-cast, or unicast. As an illustrative example, in cases where a packet is to be transmitted by the first UE to multiple destination UEs (e.g., multicast, or "one-to-many" communication), the UE may extend the DRX ON duration; however, in cases where a packet is to be transmitted by the first UE to only a destination UE (e.g., unicast, or "one-to-one" communication), the UE may not extend the DRX ON duration.

In some examples, whether the DRX ON duration may be extended by a UE may be a function of geographic locations of the UEs or a zone ID.

In some cases, whether the DRX ON duration may be extended by a UE may depend upon an attribute of a cellular interface (e.g., Uu interface) of the UE. For example, the attribute may indicate whether DRX is configured for the Uu interface, whether DRX is configured jointly for the Uu and sidelink interfaces, or DRX is configured separately for the Uu and sidelink interfaces.

Figure 10:
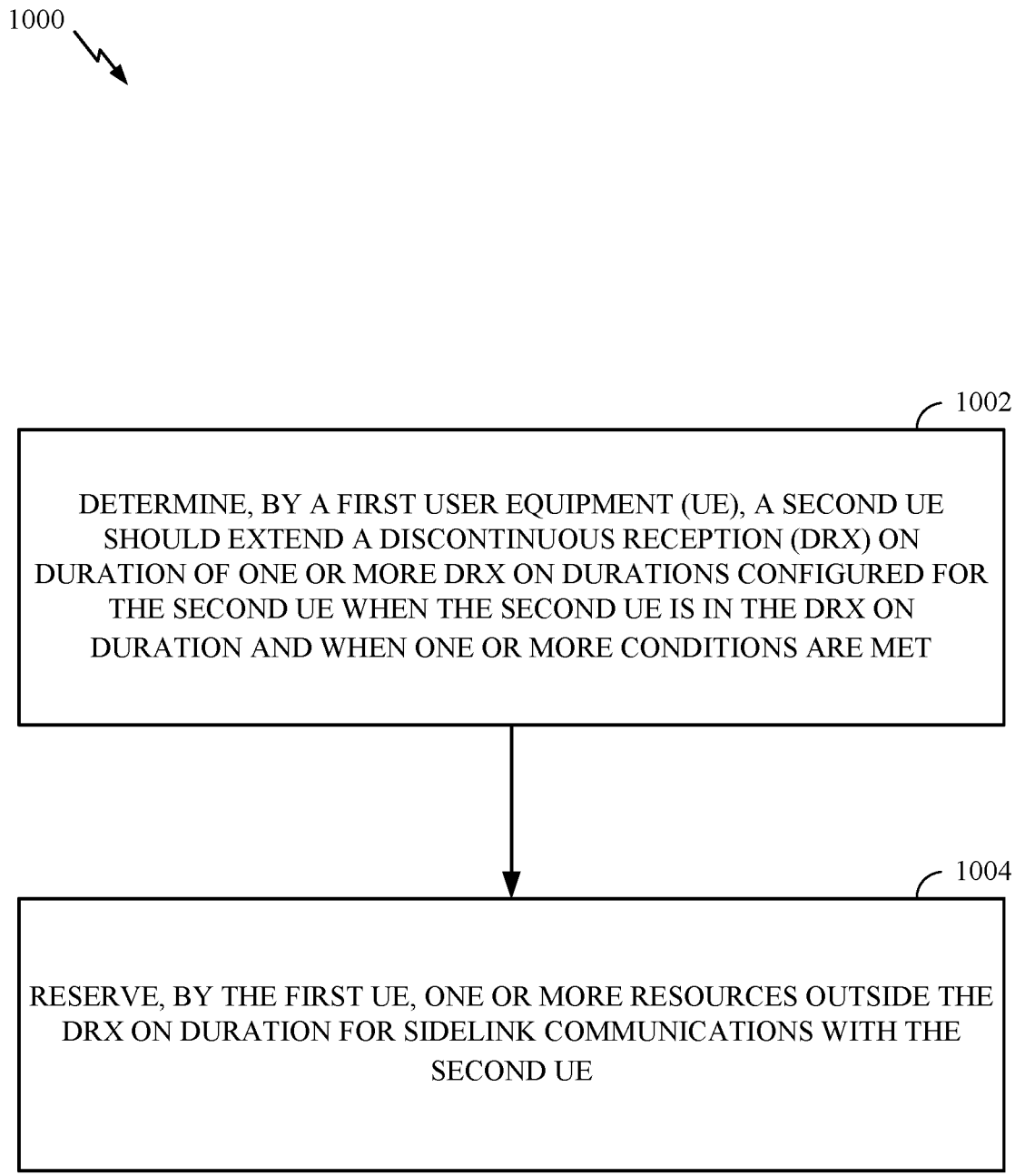
FIG. 10 is a flow diagram illustrating example operations for wireless communication by a transmitter (TX) UE, in accordance with certain aspects of the present disclosure.

FIG. 10 is a flow diagram illustrating example operations 1000 for wireless communication by a UE, in accordance with certain aspects of the present disclosure. Operations 1000 may be performed, for example, by a first UE (e.g., such as UE 120a or UE 120t in wireless communication network 100), such as a transmitter (TX) UE. As used herein, a TX UE generally refers to a UE transmitting to an RX UE during a DRX ON duration configured for the RX UE.

Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1000 begin, at 1002, by a first UE determining a second UE should extend a DRX ON duration of the one or more DRX ON durations configured for the second UE when the second UE is in the DRX ON duration and when one or more conditions are met. As described in detail above, the one or more conditions may relate to various resource pool related attributes or packet related attributes.

At 1004, the first UE reserves one or more resources outside the DRX ON duration for sidelink communications with the second UE.

Example Wireless Communication Device

Figure 11:
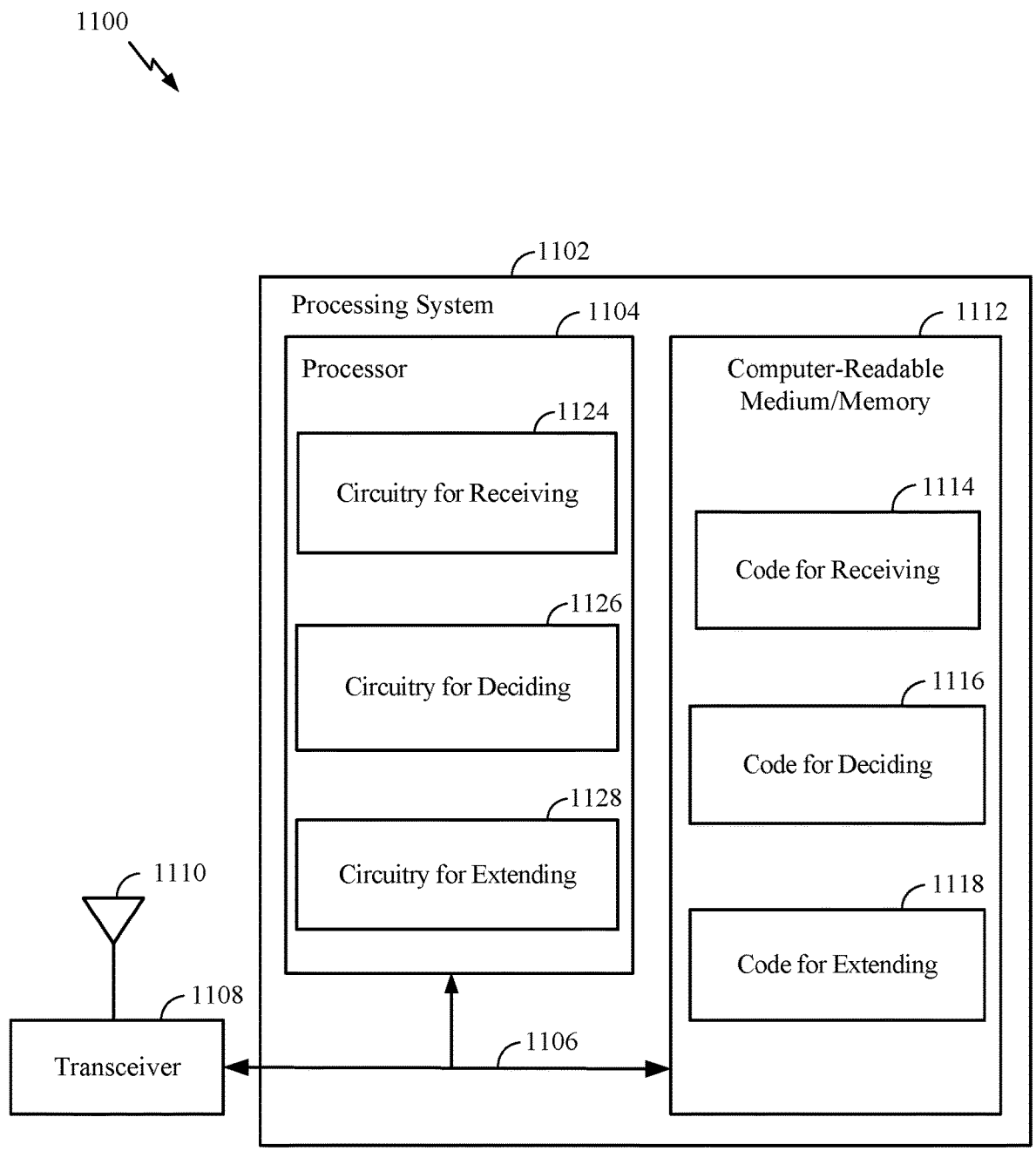
FIG. 11 illustrates a communications device that may include various components configured to perform operations for the techniques disclosed herein, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIG. 9.

Communications device 1100 includes a processing system 1102 coupled to a transceiver 1108. Transceiver 1108 is configured to transmit and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform the operations illustrated in FIG. 9. In certain aspects, computer-readable medium/memory 1112 stores code 1114 (an example means for) for receiving (e.g., for receiving signaling configuring the UE with a discontinuous reception (DRX) mode having one or more DRX ON durations for sidelink communications with at least a second UE); code 1116 (an example means for) for deciding (e.g., for deciding to extend a DRX ON duration of the one or more DRX ON durations configured for the first UE when the first UE is in the DRX On duration and when one or more conditions are met); and code 1118 (an example means for) for extending (e.g., for extending the DRX ON duration), etc.

In certain aspects, processor 1104 has circuitry configured to implement the code stored in computer-readable medium/memory 1112. Processor 1104 includes circuitry 1124 (an example means for) for receiving (e.g., for receiving signaling configuring the UE with a DRX mode having one or more DRX ON durations for sidelink communications with at least a second UE); circuitry 1126 (an example means for) for deciding (e.g., for deciding to extend a DRX ON duration of the one or more DRX ON durations configured for the first UE when one or more conditions are met); and circuitry 1128 (an example means for) for extending (e.g., for extending the DRX ON duration), etc.

In some cases, the operations illustrated in FIG. 9, as well as other operations described herein, may be implemented by one or more means-plus-function components. For example, in some cases, such operations may be implemented by means for receiving, means for deciding, and means for extending.

In some cases, means for deciding and means for extending, includes a processing system, which may include one or more processors, such as the receive processor 258, transmit processor 264, TX MIMO processor 266, and/or controller/processor 280 of UE 120a illustrated in FIG. 2 and/or the processing system 1102 of communications device 1100 in FIG. 11.

Transceiver 1108 may provide a means for receiving information such as packets, user data, or control information associated with various information channels (e.g., control channels, data channels, and information related to SR, etc.). Transceiver 1108 may be an example of aspects of transceiver 254 described with reference to FIG. 2. Antenna 1010 may correspond to a single antenna or a set of antennas. Transceiver 1108 may provide means for receiving signals generated by other components of communications device 1100.

Figure 12:
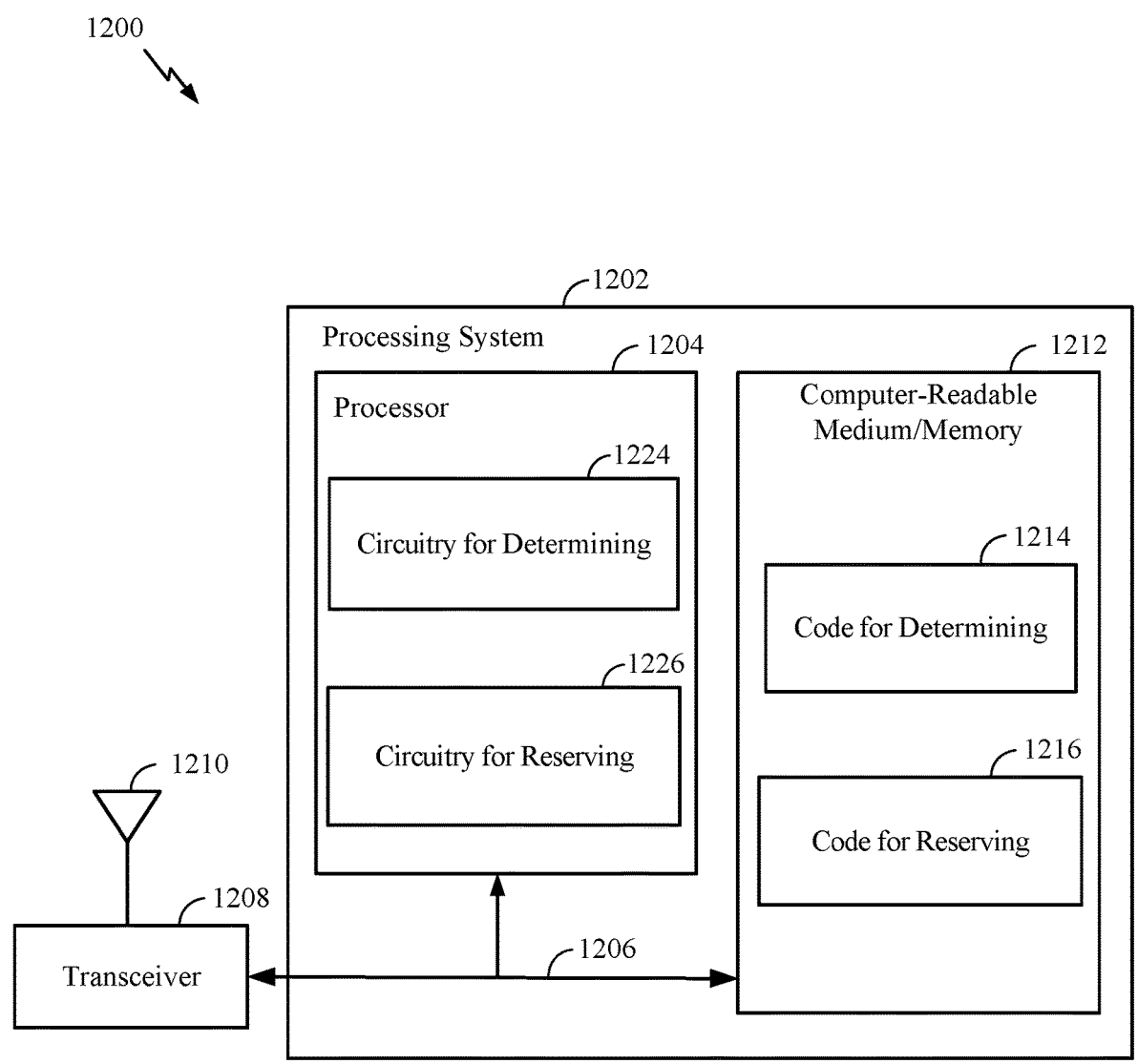
FIG. 12 illustrates a communications device that may include various components configured to perform operations for the techniques disclosed herein, in accordance with certain aspects of the present disclosure.

FIG. 12 illustrates a communications device 1200 that may include various components (e.g., corresponding to means-plus-function components) configured to perform operations for the techniques disclosed herein, such as the operations illustrated in FIG. 10.

Communications device 1200 includes a processing system 1202 coupled to a transceiver 1208. Transceiver 1208 is configured to transmit and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes a processor 1204 coupled to a computer-readable medium/memory 1212 via a bus 1206. In certain aspects, computer-readable medium/memory 1212 is configured to store instructions (e.g., computer-executable code) that when executed by processor 1204, cause processor 1204 to perform the operations illustrated in FIG. 10. In certain aspects, computer-readable medium/memory 1212 stores code 1214 (an example means for) for determining (e.g., for determining a second UE should extend a DRX ON duration of one or more DRX ON durations configured for the second UE when the second UE is in the DRX ON duration and when one or more conditions are met); and code 1216 (an example means for) for reserving (e.g., for reserving one or more resources outside the DRX ON duration for sidelink communications with the second UE).

In certain aspects, processor 1204 has circuitry configured to implement the code stored in computer-readable medium/memory 1212. Processor 1204 includes circuitry 1224 (an example means for) for determining (e.g., for determining a second UE should extend a DRX ON duration of one or more DRX ON durations configured for the second UE when the second UE is in the DRX ON duration and when one or more conditions are met); and circuitry 1226 (an example means for) for reserving (e.g., for reserving one or more resources outside the DRX ON duration for sidelink communications with the second UE).

In some cases, the operations illustrated in FIG. 10, as well as other operations described herein, may be implemented by one or more means-plus-function components. For example, in some cases, such operations may be implemented by means for determining and means for reserving.

In some cases, means for determining and means for reserving, includes a processing system, which may include one or more processors, such as the receive processor 258, transmit processor 264, TX MIMO processor 266, and/or controller/processor 280 of UE 120a illustrated in FIG. 2 and/or the processing system 1202 of communications device 1200 in FIG. 12.

Transceiver 1108 may provide a means for receiving information such as packets, user data, or control information associated with various information channels (e.g., control channels, data channels, and information related to SR, etc.). Transceiver 1108 may be an example of aspects of transceiver 254 described with reference to FIG. 2. Antenna 1010 may correspond to a single antenna or a set of antennas. Transceiver 1108 may provide means for receiving signals generated by other components of communications device 1100.

DRX manager 122 may support wireless communication in accordance with examples as disclosed herein.

DRX manager 122 may be an example of means for performing various aspects described herein. DRX manager 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, DRX manager 122, or its sub-components, may be implemented in code (e.g., as configuration management software or firmware) executed by a processor, or any combination thereof. If implemented in code executed by a processor, the functions of DRX manager 122, or its sub-components may be executed by a general-purpose processor, a DSP, an ASIC, a FPGA or other programmable logic device.

In some examples, DRX manager 122 may be configured to perform various operations (e.g., receiving, determining, transmitting) using or otherwise in cooperation with the transceiver 1008.

DRX manager 122, or its sub-components, may be physically located at various positions, including being distributed such that portions of functions are implemented at different physical locations by one or more physical components. In some examples, DRX manager 122, or its sub-components, may be a separate and distinct component in accordance with various aspects of the present disclosure. In some examples, DRX manager 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communication by a first user equipment (UE), comprising: receiving signaling configuring the first UE with a discontinuous reception (DRX) mode having one or more DRX ON durations for sidelink communications with at least a second UE; and deciding to extend a DRX ON duration of the one or more DRX ON durations configured for the first UE when the first UE is in the DRX ON duration and when one or more conditions are met.

Clause 2: The method of Clause 1, wherein when the first UE decides to extend the DRX ON duration, the method further comprises extending the DRX ON duration by: setting an inactivity timer to a non-zero value; and extending the DRX ON duration at least until the inactivity timer expires.

Clause 3: The method of Clause 1 or 2, wherein the one or more conditions comprise at least one condition based on an attribute of a resource pool assigned for the sidelink communications between the first UE and the at least the second UE.

Clause 4: The method of Clause 3, wherein the attribute indicates whether extending the DRX ON duration is allowed for the resource pool.

Clause 5: The method of Clause 3 or 4, wherein the attribute indicates a resource allocation mode configured for the resource pool.

Clause 6: The method of Clause 5, wherein when the resource allocation mode configured for the first UE involves UEs determining sidelink transmission resources, the first UE decides to extend the DRX ON duration.

Clause 7: The method of any of Clauses 3-6, wherein the attribute indicates whether the resource pool is configured with sidelink feedback.

Clause 8: The method of Clause 7, wherein when the resource pool is configured with sidelink feedback, the first UE decides to extend the DRX ON duration.

Clause 9: The method of any of Clauses 1-8, wherein the one or more conditions comprise at least one condition based on an attribute of a packet to be transmitted between the first UE and the at least the second UE during the DRX ON duration.

Clause 10: The method of Clause 9, wherein the attribute indicates whether sidelink feedback is enabled for the packet.

Clause 11: The method of Clause 10, wherein when the sidelink feedback is enabled for the packet, the first UE decides to extend the DRX ON duration.

Clause 12: The method of any of Clauses 9-11, wherein: the attribute indicates a priority of the packet; and the first UE decides to extend the DRX ON duration based, at least in part, on the priority of the packet.

Clause 13: The method of any of Clauses 9-12, wherein the attribute indicates a remaining packet delay budget (PDB) for the packet.

Clause 14: The method of Clause 13, wherein when the remaining PDB is insufficient to transmit the packet in a subsequent DRX ON duration configured for the first UE, the first UE decides to extend the DRX ON duration.

Clause 15: The method of any of Clauses 1-14, wherein the one or more conditions relate to at least one of: geographic locations of the first UE and the at least the second UE; or a zone identifier (ID).

Clause 16: The method of any of Clauses 1-15, wherein the one or more conditions comprise at least one condition based on an attribute of a cellular interface between the first UE and a network entity.

Clause 17: The method of Clause 16, wherein the attribute indicates whether DRX is configured for the cellular interface.

Clause 18: The method of Clause 17, wherein the attribute further indicates: a joint DRX configuration for the cellular interface and a sidelink interface between the first UE and the at least the second UE; or separate DRX configurations for the cellular interface and the sidelink interface.

Clause 19: A method for wireless communication by a first user equipment (UE), comprising: determining a second UE should extend a DRX ON duration of one or more DRX ON durations configured for the second UE when the second UE is in the DRX ON duration and when one or more conditions are met; and reserving one or more resources outside the DRX ON duration for sidelink communications with the second UE.

Clause 20: The method of Clause 19, wherein the one or more conditions comprise at least one condition based on an attribute of a resource pool assigned for the sidelink communications between the first UE and at least the second UE.

Clause 21: The method of Clause 20, wherein the attribute indicates whether extending the DRX ON duration is allowed for the resource pool.

Clause 22: The method of Clause 20 or 21, wherein the attribute indicates a resource allocation mode configured for the resource pool.

Clause 23: The method of Clause 22, wherein when the resource allocation mode configured for the first UE involves UEs determining sidelink transmission resources, the second UE determines the first UE should extend the DRX ON duration.

Clause 24: The method of any of Clauses 20-23, wherein the attribute indicates whether the resource pool is configured with sidelink feedback.

Clause 25: The method of Clause 24, wherein when the resource pool is configured with sidelink feedback, the first UE determines the second UE should extend the DRX ON duration.

Clause 26: The method of any of Clauses 19-25, wherein the one or more conditions comprise at least one condition based on an attribute of a packet to be transmitted between the second UE and at least the first UE during the DRX ON duration.

Clause 27: The method of any of Clauses 19-26, wherein the one or more conditions relate to at least one of: geographic locations of the first UE and the second UE; or a zone identifier (ID).

Clause 28: The method of any of Clauses 19-27, wherein the one or more conditions comprise at least one condition based on an attribute of a cellular interface between the second UE and a network entity.

Clause 29: An apparatus, comprising: a memory; and one or more processors coupled to the memory, the memory and the one or more processors being configured to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first user equipment (UE), comprising:
   receiving signaling configuring the first UE with a discontinuous reception (DRX) mode having one or more DRX ON durations for sidelink communications with at least a second UE; and
   extending a DRX ON duration of the one or more DRX ON durations configured for the first UE,
   wherein extending the DRX ON duration includes setting a timer to a non-zero value based at least in part on the first UE being in the DRX ON duration and an attribute indicating that a resource pool assigned for the sidelink communications is configured with sidelink feedback, and wherein the DRX ON duration is extended at least until the timer expires.

2. The method of claim 1, wherein the timer is an inactivity timer.

3. The method of claim 1, wherein the attribute further indicates whether extending the DRX ON duration is allowed for the resource pool.

4. The method of claim 1, wherein the attribute further indicates a resource allocation mode configured for the resource pool.

5. The method of claim 4, wherein when the resource allocation mode configured for the first UE involves UEs determining sidelink transmission resources, the first UE extends the DRX ON duration.

6. The method of claim 1, wherein extending the DRX ON duration is further based on an attribute of a packet to be transmitted between the first UE and the at least the second UE during the DRX ON duration.

7. The method of claim 6, wherein the attribute of the packet indicates whether sidelink feedback is enabled for the packet.

8. The method of claim 7, wherein when the sidelink feedback is enabled for the packet, the first UE extends the DRX ON duration.

9. The method of claim 6, wherein:
the attribute of the packet indicates a priority of the packet; and
the first UE extends the DRX ON duration based, at least in part, on the priority of the packet.

10. The method of claim 1, wherein extending the DRX ON duration is further based on an attribute of a cellular interface between the first UE and a network entity.

11. The method of claim 10, wherein the attribute indicates whether DRX is configured for the cellular interface.

12. The method of claim 11, wherein the attribute further indicates:
a joint DRX configuration for the cellular interface and a sidelink interface between the first UE and the at least the second UE; or
separate DRX configurations for the cellular interface and the sidelink interface.

13. The method of claim 1, wherein the sidelink feedback is hybrid automatic repeat request (HARQ) feedback.

14. The method of claim 1, wherein the timer is a DRX hybrid automatic repeat request (HARQ) round-trip time (RTT) timer.

15. An apparatus for wireless communication by a first user equipment (UE), comprising:
a memory; and
one or more processors coupled to the memory, the memory and the one or more processors being configured to:
receive signaling configuring the first UE with a discontinuous reception (DRX) mode having one or more DRX ON durations for sidelink communications with at least a second UE; and
extend a DRX ON duration of the one or more DRX ON durations configured for the first UE, wherein the one or more processors configured to extend the DRX ON duration are configured to set a timer to a non-zero value based at least in part on the first UE being in the DRX ON duration and an attribute indicating that a resource pool assigned for the sidelink communications is configured with sidelink feedback, and wherein the DRX ON duration is extended at least until the timer expires.

16. The apparatus of claim 15, wherein the sidelink feedback is hybrid automatic repeat request (HARQ) feedback.

17. The apparatus of claim 15, wherein the timer is a DRX hybrid automatic repeat request (HARQ) round-trip time (RTT) timer.

* * * * *